United States Patent [19]
Patel

[11] 3,812,944
[45] May 28, 1974

[54] CENTRIFUGAL CLUTCH

[75] Inventor: Kiritkumar R. Patel, Cleveland, Ohio

[73] Assignee: Eaton Corporation, Cleveland, Ohio

[22] Filed: June 29, 1972

[21] Appl. No.: 267,332

[52] U.S. Cl. ........ 192/105 B, 192/48.3, 192/109 D, 188/187
[51] Int. Cl. .......................................... F16d 43/06
[58] Field of Search ...... 192/105 A, 105 B, 105 BA, 192/105 CD, 105 F, 48.3, 35, 109 D, 105 C, 105 CS, 105 CP; 188/187, 185

[56] References Cited
UNITED STATES PATENTS

| | | | |
|---|---|---|---|
| 1,832,526 | 11/1931 | Brown | 192/105 CP |
| 3,017,005 | 1/1962 | Muhlbeyer | 192/105 BA |

FOREIGN PATENTS OR APPLICATIONS

| | | | |
|---|---|---|---|
| 396,376 | 7/1933 | Great Britain | 192/105 CP |

*Primary Examiner*—Benjamin W. Wyche
*Attorney, Agent, or Firm*—Teagno & Toddy

[57] ABSTRACT

A delayed-action centrifugal clutch having a controlled deceleration mechanism for frictionally engaging the driven member to the driving member of the clutch during deceleration or stoppage of the driving member. The clutch is of the type requiring axial movement of a cammed locking member against the time-adjustable bias of a fluid displacing dashpot before radial engagement of the clutch may be obtained. The fluid in the dashpot is displaced, against a bias, from a first chamber to a second chamber whereat the displaced fluid acts against a reaction member to frictionally engage the driven portion of the clutch to the driving portion of the clutch. A variable restriction is provided in the passageway leading from the second chamber to the first chamber, and thus, upon deceleration of the driving member of the clutch, the displaced fluid is retained against the bias for a selectively variable given period of time in the second chamber whereat the displaced fluid acts against the reaction member to frictionally engage the driving member to the driven member.

20 Claims, 3 Drawing Figures

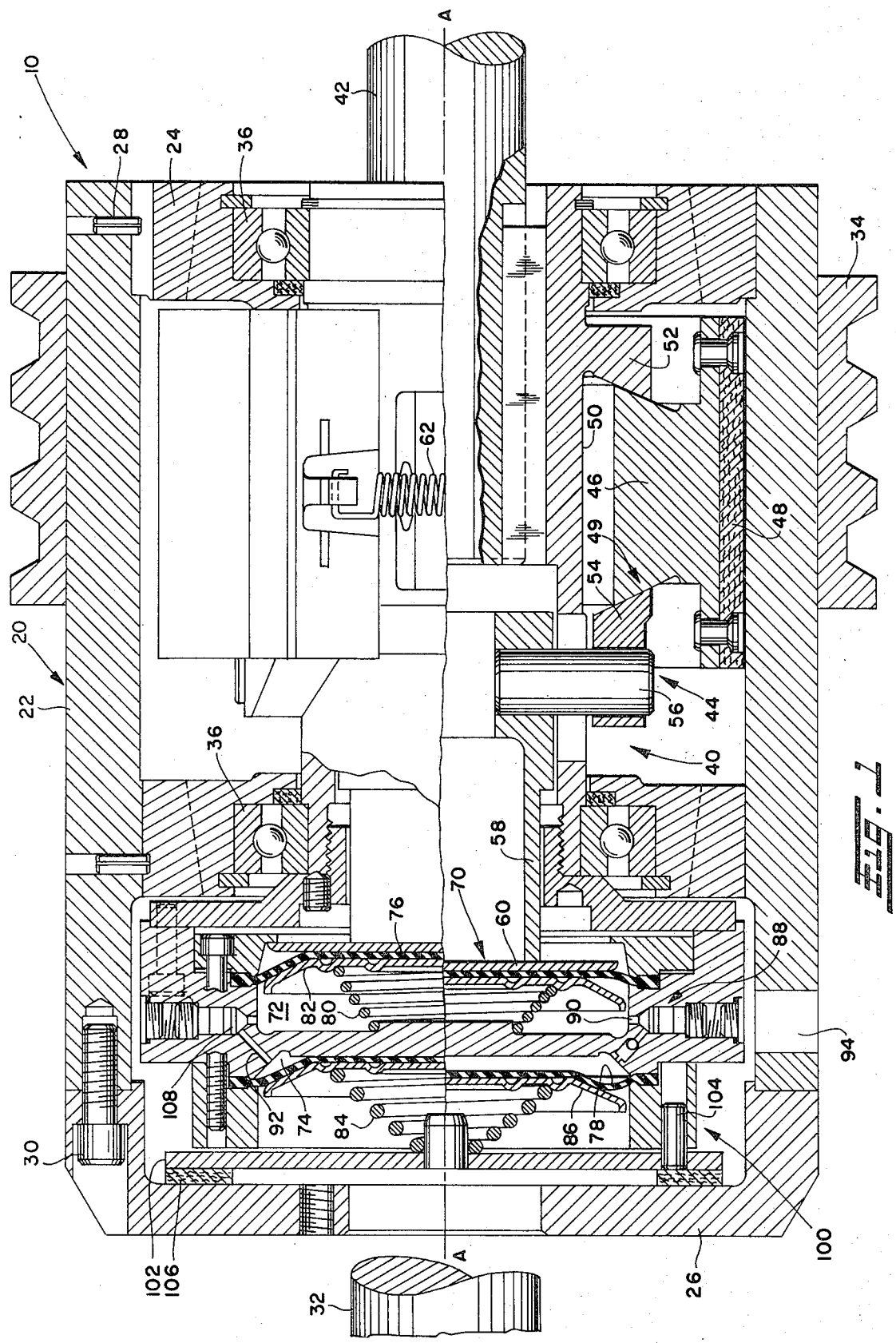

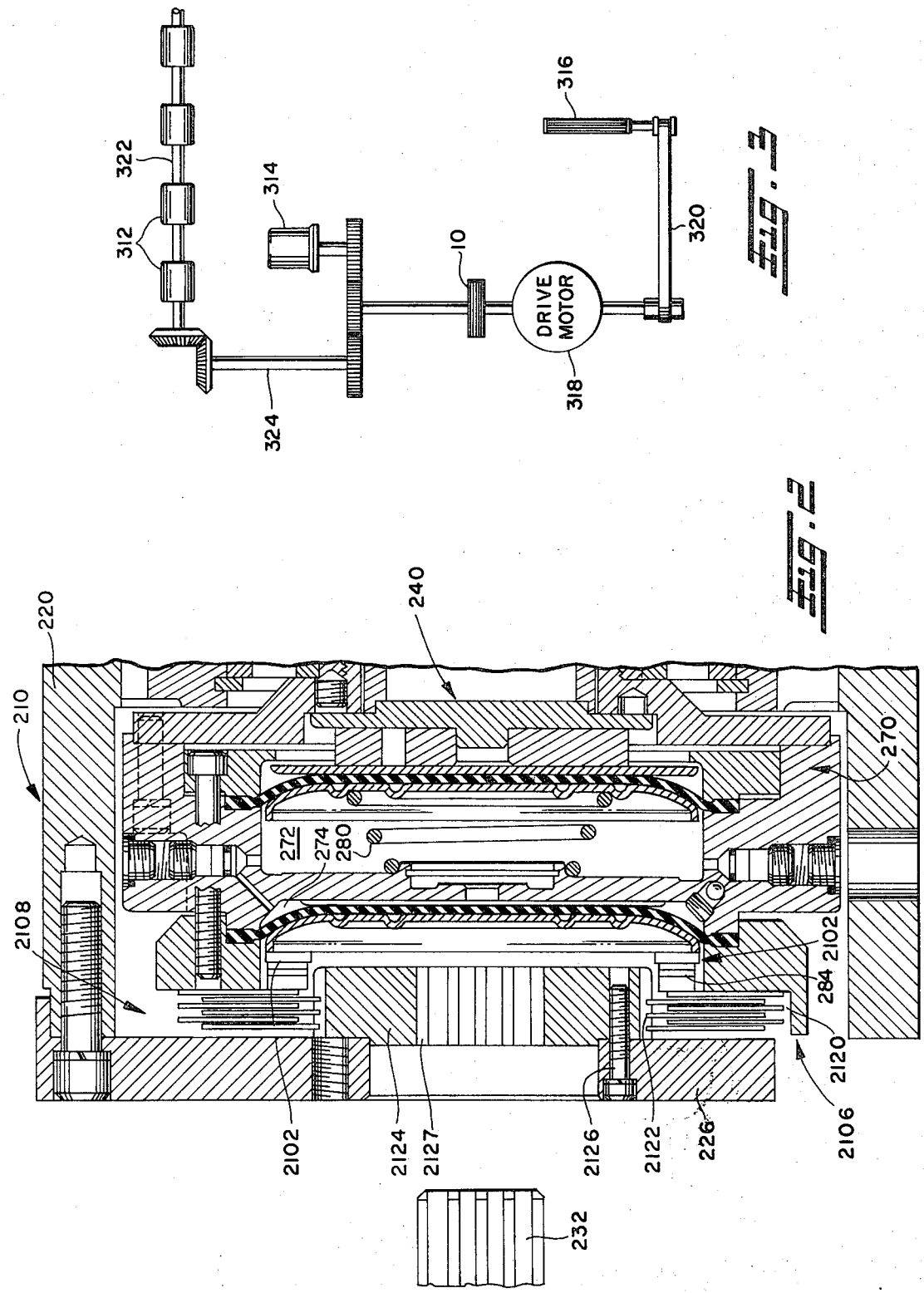

CENTRIFUGAL CLUTCH

BACKGROUND OF THE INVENTION

This invention relates to delayed action centrifugal clutches with a controlled deceleration mechanism and, more particularly, to delayed action centrifugal clutches of the type requiring an axial movement of a locking member against the bias of a fluid displacing dashpot before radial engagement of the clutch is obtained wherein the fluid displacing dashpot is also utilized to selectively control the deceleration of the driven member, or output shaft, upon deceleration of the driving member, or input shaft.

DESCRIPTION OF THE PRIOR ART

Delayed action centrifugal clutches of the type requiring an axial movement of a locking member against a bias before radial frictional or positive engagement is obtainable are well known in the art and may be more fully appreciated by reference to U.S. Pat. No. 2,720,300. Clutches utilizing an adjustable fluid-displacing dashpot as the bias to obtain an adjustable time delay are also known in the prior art as may be seen by reference to U.S. Pat. No. 3,017,005. In the prior art devices of this type, however, upon deceleration of the driving member, or input shaft, the driven member, or output shaft, was almost immediately disengaged from the driving member and allowed to rotate independently or "free wheel". In those applications where it is important to control the output shaft, or the device driven thereby, during deceleration, such as to coordinate the driven device with other functions of the process, such as in a thread drawing and twisting machine or a continuous web machine, such "free-wheeling" is not satisfactory and often results in at least partially wasting that portion of the product produced during the deceleration of the process and increased costs during start up of the machine.

SUMMARY OF THE INVENTION

In accordance with the present invention the drawbacks of the prior art have been overcome to the extent that a delayed action centrifugal clutch is provided with a control deceleration mechanism for selectively controlling the clutch driven member, or output shaft, during deceleration of the driving member, or input shaft. The above is accomplished in a delayed action centrifugal clutch of the type requiring axial movement of a locking member against a bias provided by a fluid displacing dashpot by utilizing the fluid displacing dashpot to selectively control an auxiliary frictional engagement between the clutch input and output members during deceleration or stoppage of the input member. In the preferred embodiment, the fluid-displacing dashpot consists of a first chamber normally filled with fluid, and a second chamber normally biased to a substantially zero volume or collapsed condition. A piston device cammed to axial movement in response to radial movement by the centrifugal clutch flyweights will act upon a diaphragm in the first chamber to collapse said first chamber and force fluid from the first chamber against a bias into the second chamber. A first one-way passageway for fluid communication between the first and second chambers includes a first adjustable orifice which may be adjusted to selectively control the delayed action of the centrifugal clutch as is well known in the art. The displaced fluid in the second chamber will directly or indirectly act upon a reaction member causing a frictional engagement between the driven and driving members of the clutch. A second passage leading from the second chamber to the first chamber includes a second adjustable orifice which will limit the flow of displaced fluid from the second chamber to the first chamber upon deceleration of the input member. By selectively adjusting the second adjustable orifice, the displaced fluid is maintained in the second chamber for a predetermined period of time, thus frictionally engaging the input member to the output member during said period of time. The adjustable orifices which control the passageways leading from both the first to the second chamber and from the second to the first chamber may consist of precision needle valves or any other type of adjustable orifice, as is well known in the art. The second passage may also be a one-way passage.

Accordingly, it is an object of the present invention to provide a new and improved centrifugal clutch having a controlled deceleration mechanism.

A further object of the present invention is to provide an adjustable, reliable, inexpensive mechanism for controlling the deceleration of the output shaft of a centrifugal clutch upon the deceleration of the input shaft.

Another object of the present invention is to provide an adjustable deceleration mechanism for a delayed action centrifugal clutch of the type requiring axial movement of a locking member against a fluid displacing dashpot before radial clutch engagement may occur.

These and other objects and advantages of the present invention will become apparent from the following specification and drawings.

BRIEF DESCRIPTION OF THE DRAWINGS

FIG. 1 is a sectional view of the delayed action centrifugal clutch of the present invention.

FIG. 2 is a partial view in section of a modification of the deceleration control mechanism of the present invention.

FIG. 3 is a schematic illustration of a typical application of the delayed action centrifugal clutch of the present invention.

DESCRIPTION OF THE PREFERRED EMBODIMENT

The delayed action centrifugal clutch 10 of the present invention may be seen by reference to FIG. 1 which is a sectional view which has been horizontally divided by line A—A. That portion of the drawing above line A—A illustrates the deactivated or noncentrifugally-engaged position of the clutch, while that portion of the clutch below line A—A illustrates the activated or centrifugally-engaging position of the clutch. The use of the term "clutch" is used as a descriptive term rather than a limiting term and is intended to include those devices commonly known as "brakes" wherein the "output" member is rotationally fixed.

The delayed-action centrifugal clutch mechanism of the present invention is well known in the power transmission art and may be appreciated in further detail than will be described below by reference to Muhlbeyer U.S Pat. No. 3,017,005.

Briefly, the clutch 10 comprises an external casing assembly 20, which is the driven portion of clutch 10, and an internal portion 40 which is keyed to input shaft 42 and comprises the driving portion of clutch 10. The input portion 40 includes a set of radially expandable flyweights 46 which carry friction material thereon to establish a frictional driving connection between the input and output members upon rotation of the input shaft 42. Radial expansion of the flyweights 46 is time delayed by means of a mechanism including cam ring 54, force pin 56, force ring 58 and a fluid displacing dashpot 70, all of which will be described in greater detail below. A second driving connection between the input 40 and the output 20 is established by reaction member 102 of the dashpot 70 when the dashpot has displaced fluid in its normally empty chamber 74 and will serve to retain the input and output in driving connection for a selected period of time as the input decelerates causing the flyweights to radially retract.

External casing assembly 20 comprises a central casing portion of generally cylindrical shape 22, a right-hand end plate or cap 24 and a left-hand end plate or cap 26. The end plates 24 and 26 may be nonrotationally secured to the central casing 22 by any conventional means such as illustrated bolts 28 and 30. The driven member may be used to power one or more output devices such as output shaft 32 keyed to end plate 26, or may be used to power a belt sheave 34 mounted to the cylindrical case portion 22. The internal or driving portion 40 of clutch 10 is rotationally mounted to the external or driven portion 20 by means of bearings 36.

The internal or driven portion 40 of the clutch 10 comprises the rotationally joined flyweight friction shoe and locking member assembly 44 and the fluid displacing dashpot assembly 70.

The flyweight friction shoe and locking member assembly 44 comprises a plurality of equally circumferentially spaced flyweights 46, each of which carry friction materials 48 for frictional engagement with casing 22, and each of which are rotationally fixed to input shaft 42 for rotation therewith. The flyweights 46 have a radially inwardly located dove-tailed portion 49 which mates with a dove-tailed slot 50 formed in combination by axially-fixed cam 52 and axially-movable cam ring 54. As can be seen from the drawings, cam ring 54 in its right-handmost position will radially lock flyweights 46 against outward engagement until an axial movement of the cam ring 54 has occurred. As the input shaft 42 is rotated, flyweights 46 exert an axial force on cam ring 54 as a result of centrifugal force which is transferred by force pin 56 to axially movable force ring 58 which acts upon a piston 60 which is biased to the right by fluid displacing dashpot 70. As may be seen in the upper portion of FIG. 1, flyweight return springs 62 are utilized to help overcome inertia and other effects to assure the flyweights will return to their radially retracted positions upon deceleration of the input shaft 42.

The fluid-displacing dashpot assembly 70 comprises a first, normally-filled, variable volume fluid chamber 72 and a second normally-collapsed variable volume displaced fluid-receiving chamber 74. The chambers 72 and 74 each have one wall thereof defined by flexible diaphragms, 76 and 78 respectively, which, by axial movements thereof, may change the fluid holding capacity of the respective chambers. The first chamber 72 is biased by the action of spring 80 acting upon the disc 82 which, in turn, presses upon the flexible diaphragm 76 to place chamber 72 in a maximum volume condition. The second chamber 74 is biased by the action of spring 84 acting upon disc 86 which, in turn, presses against flexible diaphragm 76 moving the diaphragm to a position whereat the second chamber is at a substantially collapsed or minimum fluid-holding volume condition. A first one-way passage 88 provides fluid communication from the first to the second chamber. A restricted orifice 90 is placed in the one-way passageway 88 between the first and the second chamber and may comprise a conventional needle valve or the like. A second passage 92 is provided to establish fluid communication from the second to the first chambers. Thus, in the deactivated condition of the clutch 10 as is seen above line A—A in FIG. 1, the action of the springs 80 and 84 is to bias substantially all of the fluid into the normally-filled first chamber 72 and thus to force diaphragm 76 to its right most position which, in turn, biases the locking mechanism including cam ring 54 to the right to hold the flyweight friction shoes 46 radially inwardly. Upon rotation of the input shaft 42 the centrifugal action of the flyweights 46 is transferred by means of cam 54, force pin 56, force ring 58 to the piston 60 which acts upon the diaphragm 76 in the first chamber overcoming the bias of springs 80 and 84 to displace the liquid from chamber 72 through passageways 88 and 92 into displaced fluid receiving chamber 74 allowing the cam member 54 to move to the left which, in turn, permits the flyweight friction shoes to move radially outwardly to establish a driving connection between the driven and the driving members as is shown below line A—A in FIG. 1. In the event that passage 92 is a one-way passage, passage 88 will provide the only fluid communication for fluid flowing from the first to the second chambers. In either event, the restricted orifice 90 will limit the total flow of fluid through passageway 88 and will thus establish a delayed action for clutch 10. The restricted orifice 90 controlling passageway 88 is selectively variable and thus the time delay for activating of clutch 10 is selectively variable, as is well known in the art. A through hole 94 may be provided in casing portion 22 to permit external adjustments to needle valve 90 when the valve 90 is brought into registration therewith.

Upon deceleration or stoppage of the input shaft 42, the flyweights 44 will radially retract under the influence of return spring 62 allowing the bias of springs 84 and 80 to force the displaced fluid from chamber 74 back to chamber 72 through return passage 92. The radial retraction of the flyweight friction shoes will also disengage the centrifugal frictional connection between the driven 20 and driving 40 portions of the clutch 10. The delayed action centrifugal clutch described above is well known in the art and constitutes the environment for the present invention to be described in detail below.

In the present invention, a simple, efficient, inexpensive, adjustable deceleration control mechanism 100 has been provided which, in cooperation with the fluid displacing dashpot assembly 70 in the delayed-action centrifugal clutch 10, adjustably controls the rotational deceleration of the driven member 20 upon rotational deceleration or stoppage of the driving member 40.

The deceleration control mechanism 100 comprises an annular reaction member 102 which is rotationally fixed as at pins 104 to the driving portion 40 of clutch 10 at the axial end of the second chamber 74 opposed from the force ring 58 and piston 60. The reaction member 102 carries a friction surface 106 which is selectively engageable to establish an auxiliary frictional coupling between the driven portion 40 and the driving portion 20 of clutch 10 as will be discussed below. The reaction member is adapted so that the presence of fluid in displaced fluid-receiving second chamber 74 will, directly or indirectly, cause the friction surface 106 to engage casing 20 as at end plate 26 and establish a driving coupling therebetween.

In the embodiment shown in FIG. 1, the passage of displaced fluid into chamber 74 causes the diaphragm 78 to move to the left as chamber 74 expands to receive the displaced fluid which, in turn, forces disc 86 to the left applying a compression force upon spring 84 which is transmitted to reaction member 102, causing the driving frictional engagement between friction surface 106 and casing 20 to occur. An adjustable needle valve 108 is provided to control the second passage 92 leading from second chamber 74 and first chamber 72 and will selectively control the amount of time fluid is retained in the second chamber 74, against the bias of spring 84, upon rotational deceleration or stoppage of the input shaft 42. Adjustable needle valve 108 may be externally adjusted when brought into registration with through hole 94. Passage 92 may be a one-way passage by use of one-way check valve or a one-way needle valve as is well known in the art.

A modification of the present invention may be seen by reference to FIG. 2 which is a partial sectional view of the dashpot assembly 270 and deceleration control mechanism 2100 portion of clutch 210. It is understood that the remainder, or unshown portion of clutch 210 is structurally and operationally substantially identical to that of previously described clutch 10, and thus will not be shown or described.

Clutch 210 has a fluid displacing dashpot assembly 270 comprising a normally filled first chamber 272 and a normally collapsed displaced fluid receiving second chamber 274. As was described for clutch 10, a first spring 280 biases chamber 272 into a fully opened condition, while a second spring 284 biases chamber 274 into a normally collapsed condition. In the illustrated embodiment spring 284 is of an axially compact structure such as a wavy spring or a Belleville washer. A reaction member 2102 transmits force, through spring 284, to the frictional coupling 2106 upon the filling of second chamber 274. The frictional coupling 2106 in the present embodiment is an interdigitated clutch pack 2108 of well-known design having discs 2120 rotationally fixed to the driving portion 240 and discs 2122 rotationally fixed to the driven portion 220 of the clutch 210 as at gear 2124. Gear 2124 is rotationally fixed to cover plate 226 as at pins 2126. Gear 2124 may have internal splines 2126 to receive an output shaft 232 for more efficient transmittal of torque therebetween. In this embodiment an interdigitated clutch pack 2108 is utilized which is a more efficient method of frictionally transmitting torque than a single friction surface as was the case in previously discussed clutch 10. The extra axial extension of clutch pack 2106 is compensated for by the use of axially compacted spring 284 and thus an axial extension of casing 220 is not required. The operational details of the deceleration control mechanism 2100 and the delayed action centrifugal engagement of clutch 210 is otherwise identical to that of delayed action centrifugal clutch 10 discussed above.

APPLICATION OF THE INVENTION

An example of a typical application of the controlled deceleration delayed-action centrifugal clutch, 10 or 210, of the present invention may be seen by reference to FIG. 3 which illustrates a drawtwister machine 310 such as is utilized to stretch and twist synthetic compositions, such as nylon, as is well known in the textile industry. A detailed explanation of the operation of this machine, and machines of this type, may be had by reference to U.S. Pat. No. 2,952,115.

Briefly, filament is picked up by the feed rolls 312 and fed into the draw rolls 314 which have a higher rotational velocity than feed rolls 312 and will thus stretch or draw the filament. The filament is then twisted and collected on spindles 316. An electric drive motor 318 is provided to drive feed rolls 312, draw rolls 314 and spindles 316. Drive motor 318 drives a plurality of spindles 316 by means of a belt 320 and drives feed rolls 312 and draw rolls 314 by means of a delayed action centrifugal clutch 10 which in turn drives the geared shafts 322 and 324 upon which the feed and draw rolls, 312 and 314 respectively, are mounted.

At start up of the machine 310, the belt 320 driving spindles 316 will slip a known amount, and thus it is desirable that the feed rolls 312 and draw rolls 314 slip a like amount to provide a smooth start up for the machine by coordinating the feed and draw rolls to the spindles. The use of a delayed-action action coupling, such as a delayed-action centrifugal clutch for this application, is known in the art. The delayed action also allows the electric drive motor 318 to come up to rated speed and torque before the full load of machine 310 is applied thereto and will thus prevent burn up of the electric motor 318. After completion of a run, or "doff" as it is known in the industry, the electric drive motor 318 is turned off. In a conventional delayed-action centrifugal clutch the output 322 of the clutch would be immediately disengaged from the input of the clutch and be allowed to free wheel. The spindles 316 under the influence of their own rotational inertia plus that of the drive motor and belts would continue to spin while the feed rolls and drawrolls, 312 and 314, due to high frictional causes, would come to a relatively quick stop. The above condition would result in either snapping of the thread or pulling of the thread by the spindles through the feed and draw rolls which is undesirable as the correct amount of draw or stretch will not be obtained. It is not uncommon for the product produced at the end of a doff to contain a large amount of scrap or waste for the reasons discussed above. By the use of a controlled adjustable deceleration device, such as controlled deceleration, delayed-action centrifugal clutch 10, the devices driven by the clutch, such as the feed and draw rolls, may be decelerated at a rate which is matched to and coordinated with the remainder of the machine, namely the spindles, and thus eliminate the waste which normally occurs at the end of the doff.

The above example is simply a typical application of a web or draw operation in which a controlled deceleration is desirable. Other applications and uses of controlled deceleration delayed action centrifugal clutches will be obvious to those skilled in the art.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

I claim:

1. A controlled deceleration delayed action centrifugal coupling comprising:

a rotatable driving member;
a rotatable driven member;
primary means for radially coupling said driving member to said driven member, said primary means for coupling including a plurality of radially expandable flyweights centrifugally actuated by the rotation of said driving member whereby the flyweights frictionally engage the driven member;
axially movable locking means for controlling the radial expansion of said flyweights, said locking means in a first position preventing rotational expansion of said flyweights and in a second position allowing radial expansion of said flyweights, said locking means subject to an axial force exerted by said flyweights upon rotation of said driving member tending to axially move said locking means from said first to said second position;
biasing means rotationally fixed to said driving member for controlling the axial movement of said locking means, said biasing means having an undeformed position for biasing said locking means to said first position and a resiliently deformed position allowing said locking means to move axially to said second position, said biasing means including secondary axially movable coupling means, said biasing means in said deformed position establishing an axial frictional engagement of said secondary coupling means between said driving and said driven members; and
means to control said biasing means resilient return to said undeformed position upon deceleration or stoppage of said driving member to maintain said axial frictional engagement between said driving and said driven member during deceleration or stoppage of said driving member.

2. The coupling of claim 1 wherein said biasing means includes adjustment means for adjusting the time required for said biasing means to resiliently return to said undeformed position from said deformed position.

3. The coupling of claim 2 wherein said locking means includes a cam for subjecting said locking means to an axial force exerted by said flyweights upon rotation of said driving member and for preventing radial expansion of said flyweights when said locking member is in said first position.

4. The coupling of claim 3 wherein said coupling is a clutch.

5. A controlled deceleration delayed action centrifugal clutch comprising:

a rotatable driving member;
a rotatable driven member;
means for radially frictionally coupling said driving member to said driven member, said means for radially coupling including a plurality of radially expandable flyweights centrifugally actuated by the rotation of said driving member, said flyweights carrying frictional material on the outer radial circumferences thereof;
axially movable locking means for controlling the radial expansion of said flyweights, said locking means in a first position preventing rotational expansion of said flyweights and in a second position allowing radial expansion of said flyweights, said locking means subject to an axial force exerted by said flyweights upon rotation of said driving member tending to axially move said locking means from said first to said second position, said locking means including a cam for subjecting said locking means to an axial force exerted by said flyweights upon rotation of said driving member and for preventing radial expansion of said flyweights when said locking member is in said first position;
biasing means rotationally fixed to said driving member for controlling the axial movement of said locking means, said biasing means having an undeformed position for biasing said locking means to said first position and a resiliently deformed position allowing said locking means to move axially to said second position, said biasing means in said deformed position establishing an axial frictional engagement between said driving and said driven members;
and means to control said biasing means resilient return to said undeformed position upon deceleration or stoppage of said driving member to maintain said axial frictional engagement between said driving and said driven member during deceleration or stoppage of said driving member, said means to control including adjustment means for adjusting the time required for said biasing means to resiliently return to said undeformed position from said deformed position.

6. The clutch of claim 5 wherein said biasing means is a fluid-displacing dashpot, said adjustment means including a controlled restricted orifice through which the displaced fluid must flow to return to said dashpot to an undeformed condition.

7. The clutch of claim 6 wherein said fluid displacing dashpot is rotationally fixed to said driving member and includes a first normally-filled chamber and a second normally-axially collapsed displaced fluid-receiving chamber, said second chamber carrying an axially movable friction member which, upon axial expansion of said second chamber caused by receipt of displaced fluid, will cause said friction member to engage said driven member.

8. The clutch of claim 7 wherein said output member comprises the housing of said clutch.

9. The clutch of claim 8 wherein said controlled restricted orifice includes a needle valve.

10. The clutch of claim 9 wherein said needle valve is registrable with an aperture in said housing for access from outside of said coupling.

11. The clutch of claim 10 wherein said friction member is an interdigitated disc clutch pack.

12. In a centrifugally controlled coupling of selectively delayed action comprising, a revolvable driving member, a revolvable driven member, an intermediate coupling member revolvable together with said driving member and radially movable due to centrifugal force into coupling engagement with said driven member, first transmitting means movable longitudinally relative to said driving member in a given direction parallel to the access of revolution, said first transmitting means having a surface in engagement with said intermediate member for limiting the radial motion of the latter depending upon the longitudinal motion of said first transmitting means and to hold said intermediate member disengaged from said driven member while said driving member is at rest, adjustable time delay means comprising a damping device having a fluid displacing means operatively connected with said force transmitting means for movement by said force transmitting means in said given direction, said damping device, being provided with a variable volume hydraulic chamber cooperating with said fluid displacing means to receive hydraulic fluid displaced thereby, and adjustment means for adjusting the time flow rate of fluid to said variable volume hydraulic chamber, said improvement comprising;
  an auxiliary friction member rotationally fixed to said driving member and actuatable by expansion of said variable volume hydraulic chamber to frictionally engage said driven member; and
  means for controlling the flow of fluid from said variable volume hydraulic chamber to said fluid displacing device to control the friction engagement of said auxiliary friction member and said driven member upon deceleration or stoppage of said driving member.

13. The coupling of claim 12 wherein said driven member comprises the housing of said coupling and said friction member is axially engageable by the axial expansion of said variable volume hydraulic device.

14. The coupling of claim 13 wherein said variable volume hydraulic device and said fluid displacing device fluidly communicate by means of two fluid passages, the first passage including a one-way valve permitting flow from said fluid displacing device to said variable volume hydraulic device only, the second passage permitting fluid flow from said variable volume hydraulic device to said fluid displacing device, said means for controlling the flow of fluid from said variable volume hydraulic device to said fluid displacing devices comprising an adjustable restricted orifice interposed said second passage.

15. The clutch of claim 14 wherein said adjustable restricted orifice comprises a needle valve.

16. The clutch of claim 15 wherein said needle valve is registrable with an orifice in said casing for access from the outside of said coupling.

17. The clutch of claim 15 wherein said second passage includes a one-way valve permitting fluid flow from said variable volume hydraulic device to said fluid displacing device only.

18. In a centrifugally controlled coupling of selectively time delayed action comprising a revolvable driving member, a revolvable driven member forming a housing coaxial with said driving member and enclosing said driving member, an intermediate member mounted on said driving member within said housing and being centrifugally movable relative to said driving member into coupling engagement with said driven member, force transmitting means movable longitudinally relative to said driving member in a given direction parallel to the access of revolution, said force-transmitting means and said intermediate member for mutually engaging slanting surfaces for transmitting an axial component of the radial centrifugal force to said force transmitting means and for holding said intermediate member disengaged from said driven member with said driving member, is at rest, a damping device having axially movable fluid displacing means operably connected with said force transmitting means for axial displacement thereby within said housing in a given direction, and a first return spring axially urging said fluid displacing means and said first transmitting means in opposition to said axial first component, said damping device being provided with a variable volume hydraulic chamber communicating with said fluid displacing means to receive hydraulic fluid displaced thereby, said variable volume hydraulic device having a second return spring urging said variable volume hydraulic device to a substantially axially collapsed condition, the improvement comprising;
  an axially movable reaction member rotationally fixed to said driving member carrying an axially engageable friction surface operably connected to said second return spring, said reaction member causing said friction surface to axially frictionally engage said housing upon axial expansion of said variable volume hydraulic device when said device receives displaced hydraulic fluid, and
  means for controlling the return flow of displaced hydraulic fluid from said variable volume hydraulic device to said fluid displacing means to control the axial frictional engagement between said friction surface and said housing, upon deceleration or stoppage of said driving member.

19. The clutch of claim 18 wherein said communication between said fluid displacing means and said variable volume hydraulic device comprise a first one-way passage permitting fluid flow from said fluid displacing device to said variable volume hydraulic device only and a second passage permitting fluid flow from said variable volume hydraulic device to said fluid displacing means, said means for controlling the flow return of fluid from said variable volume hydraulic device to said fluid displacing device comprising an adjustable restricted orifice in said second passage.

20. The clutch of claim 19 wherein said adjustable restricted orifice comprises a needle valve.

* * * * *